United States Patent [19]

Slegers

[11] Patent Number: 4,980,066
[45] Date of Patent: Dec. 25, 1990

[54] MULTIPLE MEMBRANE SEPARATION SYSTEMS

[75] Inventor: John Slegers, Breda, Netherlands

[73] Assignee: Romicon B.V., Oosterhout, Netherlands

[21] Appl. No.: 331,471

[22] Filed: Mar. 31, 1989

[30] Foreign Application Priority Data

Mar. 31, 1988 [GB] United Kingdom ................. 8807825

[51] Int. Cl.$^5$ ............................................. B01D 65/02
[52] U.S. Cl. .................................. 210/636; 210/638; 210/321.69; 210/321.89; 210/406
[58] Field of Search ...................... 210/636, 638, 323.2, 210/406, 411, 321.69, 321.89, 639

[56] References Cited

U.S. PATENT DOCUMENTS

| | | | |
|---|---|---|---|
| 3,462,362 | 8/1964 | Kollsman | 210/639 X |
| 3,782,556 | 1/1974 | Murkes | 210/409 |
| 3,856,569 | 12/1974 | Strong | 210/638 X |
| 4,282,097 | 8/1981 | Kuepper et al. | 210/409 X |

OTHER PUBLICATIONS

Koch Membrane Systems, Inc. *Microfiltration helps brewers boost profits (Wilmington, Mass.)*.
"Prevaporation Frees the Spirit", Processing, Feb. 1989 pp. 35 and 36.
Millipore, Inc. (Bedford, Mass.), Product Catalog, pp. 186-193, 276-282, 294-297.

*Primary Examiner*—Frank Spear
*Attorney, Agent, or Firm*—Mervin E. Brokke

[57] ABSTRACT

An improved membrane separation system is provided, which comprises a plurality of discrete membrane separation units, each membrane separation unit:
 (a) comprising at least two membranes;
 (b) comprising inlet for process fluid and, optionally, outlet for process fluid; and
 (c) being located within a container for permeate, said container comprising a permeate outlet, and wherein the container is such as to enable the membrane separation units to be at least partially immersed in permeate.

Also provided is a method of membrane separation utilizing such a system.

15 Claims, 4 Drawing Sheets

MULTIPLE MEMBRANE SEPARATION SYSTEMS

The present invention is concerned with multiple membrane separation systems, comprising a plurality of discrete membrane separation units. The present invention is particularly, but not exclusively, concerned with multiple ultrafiltration systems.

Membrane separation techniques, by which we mean ultrafiltration (e.g. in which the membranes have pores with a diameter of up to 0.02 micrometers), microfiltration (e.g. in which the membranes have pores with a diameter of at least 0.03 micrometers), and reverse osmosis, are well known techniques in industry.

One configuration in which membrane separators can be operated is the so-called "cross-flow" configuration. To enable operation in this configuration the separators have a process fluid inlet (i.e. an inlet for fluid to be treated) and a process fluid outlet (i.e. an outlet for treated fluid which has not passed through the membrane) on one side of the membrane. The process fluid to be treated enters the separator via the process fluid inlet, passes across the surface of the membrane on the side on which are located the process fluid inlet and outlet, and a portion of the process fluid passes through the membrane (i.e. as permeate) with the remainder leaving the separator via the process fluid outlet and, optionally, being recycled back to the separator for further treatment. This type of separator, which for convenience will hereinafter be referred to as a separator of the cross flow type, may be used for various purposes such as (a) to produce a fluid having a concentration of one or more components thereof which is greater after treatment than before treatment, in which case the desired product is the fluid leaving the separator through the process fluid outlet, (b) to purify a fluid, in which case the desired product is the permeate, or (c) to separate one or more components from the fluid, in which case the desired product may be one or more of the fluid passing through the membrane (i.e. the permeate), the fluid leaving the separator through the process fluid outlet, or the component(s) retained by the membrane.

An alternative to the cross flow configuration is the so-called "dead-end" configuration. To operate in this configuration, the separators have a process fluid inlet on one side of the membrane but either do not have a process fluid outlet on that side or any such outlet is closed. The process fluid to be treated enters the separator via the process fluid inlet and all of such process fluid, which is of a molecular size enabling it to pass through the membrane, will pass therethrough as permeate. This type of separator, which for convenience will hereinafter be referred to as a separator of the dead end type, may be used to separate one or more components from the fluid, such separated component(s) being retained by the membrane. In this case the desired product may be the permeate, the retained component(s), or both.

During use, the side of the membrane contacting the fluid to be treated (i.e. the process fluid) will typically become fouled by material retained by the membrane. In the case of cross flow separators such fouled membranes may be cleaned and reused, and such cleaning may be effected (i) by mechanically removing the foulant material, for example by use of a brush or rod, but this is impractical if the membranes are such that the passage through which the process fluid flows is narrow, for example if the membranes are in the form of hollow fiber membranes, (ii) by pumping a fluid, for example water, at high flow rate across the fouled surface of the membrane to physically dislodge and remove the foulant therefrom, this technique hereinafter being referred to as "fast flush", (iii) by contacting the fouled surface of the membrane with a chemical cleaning fluid, this technique hereinafter being referred to as "chemical cleaning", (iv) by pumping fluid, for example permeate or water, under pressure through the membrane from the permeate side to the process fluid side thereof such that the fluid physically dislodges and removes any foulant material from the surface of the membrane, this technique hereinafter being referred to as "pressure backwashing", or (v) a combination of two or more of (i) to (iv). In the case of dead-end separators, it is not possible to clean fouled membranes by the fast flush technique and it is often only practical to clean such fouled membranes by the pressure backwashing technique.

In any of the above-described fast flush, chemical cleaning and pressure backwashing techniques, it is important that the fluid pressure is carefully controlled so that the pressure difference between the fluid on one side of the membrane and that on the other side of the membrane does not exceed the maximum allowable transmembrane pressure difference for that particular membrane, otherwise damage to the membrane will result. The maximum allowable transmembrane pressure difference for a particular membrane is the maximum pressure difference, between opposite sides of a membrane, that can be accommodated by the membrane without damage resulting thereto. Currently, the pressure is usually created in the cleaning fluid by means of a pump and this can give rise to hydraulic pressure surges which may be sufficient to damage the membrane.

When the membranes are severely fouled, for example plugs of foulant material are present preventing or inhibiting the free flow of process fluid across the membrane surface, the fast flush and chemical cleaning techniques may be insufficient to satisfactorily clean the membrane, and mechanical cleaning and/or pressure backwashing may be required if satisfactory cleaning is to be achieved. Of course, as explained above, mechanical cleaning may be impractical for certain types of membranes, for example hollow fiber membranes, and pressure backwashing has the disadvantage of the need to carefully control the pressure of the fluid in order to avoid damage to the membranes.

A disadvantage of the chemical cleaning technique is that the cleaning fluid is typically transferred from a storage tank, contacted with the fouled membrane to dissolve/disperse the foulant material, and then transferred back to the storage tank. This results in the cleaning fluid in the storage tank becoming contaminated with the foulant material and this large volume of cleaning fluid must, therefore, itself be cleaned if it is to be reused.

A known multiple membrane separation system comprises a plurality of cross flow hollow fiber ultrafiltration or microfiltration cartridges, each cartridge having a process fluid inlet connected to a first manifold, a process fluid outlet connected to a second manifold, and at least one permeate outlet connected to a third manifold, each of the manifolds being fixed to an external supporting frame. Such systems, however, possess the following disadvantages:

1. The need to connect each of the cartridges together by means of appropriate manifolds results in a complicated system requiring a considerable amount of hardware, i.e. piping.
2. The complicated nature of the construction and the amount of hardware involved results in the systems being large in size.
3. As the system is mounted on a supporting frame and the inlets and outlets of each cartridge are connected to the appropriate manifolds, which are themselves fixed to the supporting frame, the overall system has to be very carefully engineered to a high degree of accuracy in order to achieve satisfactory seals between the inlets/outlets of the cartridges and the appropriate manifold, otherwise leaks and damage to the delicate cartridges, due to stress, may result.
4. As typically the supporting frame will be at room temperature but the ultrafiltration and microfiltration cartridges will be at elevated temperature during use, stresses may result within the system during use and such stresses may result in leaks in the system and/or damage to the delicate cartridges.
5. To allow periodic cleaning of the cartridges by any of the fast flush, chemical cleaning or pressure backwashing techniques, to prevent clogging of the cartridges and enable their reuse, additional equipment is required, for example additional piping, additional storage tanks, or both, and this adds to the complexity and expense of the system.
6. During cleaning of the system by any of the fast flush, chemical cleaning or pressure backwashing techniques, the pressure applied to the fluid in the system must be carefully controlled such that the pressure difference between opposite surfaces of each membrane does not exceed the maximum allowable transmembrane pressure difference, otherwise damage to the membranes will result.

Another known multiple membrane separation system, for example as marketed by Millipore, Inc, Bedford, Mass., U.S.A. and Pall Corporation, New York, U.S.A., comprises a plurality of ultrafiltration or microfiltration cartridges of the dead end type, each cartridge comprising a paper membrane of star-shaped cross section. The cartridges are housed within a pressure vessel and are supported therein by the lid of the vessel. In use, process fluid is introduced into the pressure vessel, passes through the membranes, passes up through the space within the center of the star-shaped membrane, and leaves the cartridges via a permeate outlet located in the head of each cartridge. Disadvantages of this type of multiple membrane filtration system are as follows:

1. As the cartridges are of the dead end type, it is not possible to clean them by the fast flush techniques and, as the cartridges use paper membranes of star-shaped cross section, it is not possible to mechanically clean them or to reverse the flow of liquid through the membranes, for example as would be needed for pressure backwashing, because this would lead to the membranes being distorted and destroyed. Chemical cleaning is also ineffective for cleaning the type of membrane cartridge used in the system. Therefore, as it is not possible to clean fouled cartridges for reuse, they must be discarded and replaced when they become fouled.
2. The system requires the use of a pressure vessel and this, because of engineering constraints, imposes limitations on the maximum size of vessel that can be used and, hence, on the overall capacity of the system.

A further known multiple membrane separation system, for example as marketed by Koch Membrane Systems, Wilmington, U.S.A., comprises a plurality of tubular ultrafiltration or microfiltration membranes of the cross flow type, the membranes being connected in series and/or parallel configuration and being suspended within a container. In use, process fluid flows along the lumen of the tubular membranes and a portion thereof passes through the membrane as permeate and drips to the bottom of the container, where it is collected in a tray and is drawn off. At no time are the membranes partially or completely submerged in permeate. Disadvantages of this type of multiple membrane filtration system are as follows:

1. The membranes are intentionally not immersed in permeate in order to avoid the possibility of damage to the delicate membranes used due to the application of a back pressure to such membranes by the permeate, for example if the forward pressure due to the process fluid is either deliberately or accidentally terminated. It is, therefore, not possible to clean the membranes by the pressure backwashing technique and this may mean that it will not be possible to satisfactorily clean severely fouled membranes to enable them to be reused.
2. As in the case of the first described known multiple membrane filtration system, to allow periodic cleaning of the membranes by the fast flush or chemical cleaning technique, additional equipment is required, for example additional piping, additional storage tanks or both, and this adds to the complexity and, hence, the cost of the system.
3. During cleaning of the system by the fast flush or chemical cleaning technique the pressure applied to the fluid in the system must be very carefully controlled such that the pressure difference between opposite surfaces of each membrane does not exceed the maximum allowable transmembrane pressure difference, otherwise damage to the membranes will result.
4. As the membranes are not immersed in the permeate and the permeate drips from the membranes to collect in the tray at the base of the container, there is a significant risk of bacterial contamination of the membranes and/or the permeate from the air within the container and also a significant risk of oxidation of the permeate by the air within the container.

There remains a long felt need for a multiple membrane separation system which is simpler in construction than, and overcomes some or all of the above disadvantages of, known multiple ultrafiltration and microfiltration systems, and which can be used in high volume applications. Such a system has not been developed up to the time of the present invention.

Applicants have now surprisingly found that the construction of a multiple membrane separation system, capable of being used in high volume applications, can be considerably simplified when compared to typical known multiple ultrafiltration and microfiltration systems and that, as a result, some or all of the above-mentioned disadvantages of typical known systems may be eliminated, or at least minimised.

According to the present invention there is provided a multiple membrane separation system which comprises a plurality of discrete membrane separation units, preferably at least five membrane separation units, each membrane separation unit:

(a). comprising at least two membranes;
(b). comprising inlet for process fluid and, optionally, outlet for process fluid; and
(c). being located within a container for permeate, said container comprising a permeate outlet, and wherein the container is such as to enable the membrane separation units to be at least partially, e.g. fully, immersed in permeate.

The membrane separation units, which may be in the form of ultrafiltration, microfiltration or reverse osmosis units, may comprise polymeric or ceramic membranes. Suitable polymeric membranes include polysulfone, polyvinyl chloride and polyvinylidene difluoride membranes. Further, the membrane separation units may each comprise: (a) a plurality of hollow fiber membranes; (b) a plurality of flat sheet membranes; (c) a plurality of tubular membranes or (d) a spiral wound membrane.

The membrane separation units may be of the cross flow type, which may be connected in series and/or parallel configuration, or of the dead end type, which may be connected in parallel configuration.

If cross flow type membrane separation units are connected in parallel configuration, then the process fluid inlet of each unit may be connected to common process fluid inlet, and the process fluid outlet of each unit may be connected to common process fluid outlet. If, however, the cross flow type membrane separation units are connected in series configuration, then the process fluid outlet of the first unit of the series will be connected to the process fluid inlet of the second unit in the series, the process fluid outlet of this second unit will be connected to the process fluid inlet of the third unit of the series, and so on for each unit in the series.

If the system of the invention comprises several banks of membrane separation units, with the units of each bank being in series configuration and the banks themselves being in parallel configuration, the process fluid inlet of the first unit of each bank may be connected to common process fluid inlet and the process fluid outlet of the last unit of each bank may be connected to common process fluid outlet.

When the system of the invention comprises a plurality of dead end type membrane separation units, there will, of course, be no process fluid outlets, but the process fluid inlet of each such unit may be connected to common process fluid inlet.

Membrane separation units suitable for use in the system of the present invention include conventional cartridges comprising at least two membranes housed within a solid outer wall having one or more permeate outlets location therein. The solid outer wall is spaced from the membranes to enable permeate to collect therebetween. If such conventional cartridges are of the cross flow type, there will also be a process fluid inlet and a process fluid outlet and, if they are of the dead end type, there will be a process fluid inlet but no process fluid outlet. When such conventional cartridges are used, the permeate outlet(s) of each cartridge, in contrast to the use of the cartridges in typical known multiple membrane separation systems, are not connected to a manifold but are merely open to the space formed between the cartridges and the container.

Other forms of membrane separation unit may be used in the system of the invention. For example, the solid outer wall, present in conventional cartridges, e.g. hollow fiber cartridges, can be omitted such that the permeate flows directly from the membranes into the container of the system of the invention. In this situation, cross flow type membrane separation units will comprise at least two membranes, a process fluid inlet, and a process fluid outlet but no solid outer wall, and dead end type membrane separation units wall comprise at least two membranes and a process fluid inlet but no process fluid outlet and no solid outer wall. Further, in such cross flow type membrane separation units, although the process fluid will pass across the membrane surface from one end of the membrane to the other, it is possible for the unit construction to be such that both the process fluid inlet and the process fluid outlet from the unit are located at the same end of the unit, for example by having the process fluid inlet and process fluid outlet at one end of the unit and incorporating into the unit a pipe connecting either the process fluid inlet or the process fluid outlet of the unit with the corresponding opposite end of the unit. This arrangement in which the process fluid inlet to, and the process fluid outlet from, the membrane separation units are at the same end of the unit can give rise to reduced stress in the system, particularly when compared with the known multiple membrane separation system described first above. In certain circumstances, for example if the membranes comprise a plurality of hollow fiber membranes, e.g. hollow fiber ultrafiltration membranes, it may be necessary to support the membranes such as by housing them within a foraminous, e.g. perforated, outer support wall, the foraminous nature of this support wall enabling the permeate fluid to pass from the membrane separation unit into the container.

The ability to utilize, in the multiple membrane separation system of the invention, membrane separation units which do not contain the solid outer wall, present in conventional membrane separation cartridges, is advantageous as it allows a greater membrane surface area to be accommodated within a given volume within the container, and hence the given volume to have a greater membrane separation capacity, than if conventional membrane separation cartridges, having the solid outer wall, are used. It also allows the cross-sectional size and shape of the membrane separation units to be readily varied. For example, if membrane separation units of square cross-sectional shape are used, then the maximum possible use of the area within the container can be utilized and, hence, the maximum possible membrane surface area can be accommodated within the container.

The container of the multiple membrane separation system of the invention may be sub-divided into two or more interconnected compartments with each compartment having located therein at least one of the membrane separation units.

The system of the invention may be such that the pressure of fluid in the space between the container and the membrane separation units is atmospheric, or substantially atmospheric pressure, e.g. by venting the container to the atmosphere or providing the container with a lid which is in non-sealing engagement therewith.

In one embodiment of the present invention, the multiple membrane separation system is such as to enable the creation of a reduced pressure, e.g. a sub-atmospheric pressure, at the process fluid inlet and/or the process fluid outlet of the membrane separation units and thereby result in fluid being drawn through the membranes from the permeate side thereof to the process fluid side thereof. This may be achieved by connecting the system of the invention to an appropriate pipework/pump/valve network, for example as described hereinafter in connection with FIG. 5 of the accompanying drawings. The creation of a reduced pressure on one side of a membrane to thereby draw fluid through the membrane from the other side thereof forms the subject of our copending application No. 331,476, filed on the same day as the present application, and is advantageous in the multiple membrane separation system of the present invention as it can be used to clean fouled membranes, even severely fouled membranes, whilst at the same time reducing the risk of damage to the membranes of the system, when compared to cleaning of the system of the invention by the fast flush or chemical cleaning techniques or when compared to the cleaning of known membrane separation systems by the fast flush, chemical cleaning or pressure backwashing techniques. Such cleaning of the membranes, which for convenience will hereinafter be referred to as suction backwash cleaning, is achieved because the flow of fluid from the permeate side of the membranes to the process fluid side thereof will dislodge foulant material on the permeate side of the membranes and this foulant material will be removed from the membrane separation unit with the fluid. Reduced risk of damage to the membranes is achieved as suction backwash cleaning, in contrast to the fast flush, chemical cleaning and pressure backwashing techniques, does not require the use of fluid under pressure and thereby avoids the possibility of the above described hydraulic pressure surges occurring upstream of the membrane(s). Further, if the container is vented to the atmosphere, reduce risk of damage to the membrane is achieved because the maximum transmembrane pressure difference that can be achieved between the process fluid and permeate sides of the membranes using such reduced pressure to effect cleaning is atmospheric pressure plus the hydrostatic head of the fluid in the container, whereas in the fast flush, chemical cleaning and pressure backwashing techniques fluid is pumped through the process fluid inlet of each membrane, across the surface of the membrane, and out through the process fluid outlet of each membrane, and the pressure applied to the fluid by the pump must be carefully controlled, so that the pressure difference between the process fluid and permeate sides of the membranes does not exceed the maximum allowable transmembrane pressure difference.

The permeate fluid outlet of the container of the system of the invention may be connected to a pump to aid in removal of permeate fluid from the container and/or to provide suction for suction backwash cleaning of the membrane separation units. Also, a pump may be provided upstream of the process fluid inlets to the membrane separation units to aid in circulation of fluid throughout the system.

The container and pipework of the system of the invention may, for example, be constructed from plastics material such as polyvinyl chloride, stainless steel or carbon steel.

The container of the multiple membrane separation system of the invention can have a multifunctional character. It may act as a support for the membrane separation units, thereby enabling the external supporting frame, which has typically been required in the known multiple membrane separation systems described first above, to be dispensed with and eliminating, or at least minimising, the thermal stresses that have been found to occur in such known multiple membrane separation systems. This elimination or minimising of stresses is because both the membrane separation units and the container, which acts as the support for the membrane separation units, will contact the permeate and the temperature difference between these two parts of the system will be less than if the membrane separation units were to be supported on an external frame (i.e. as in the known system described first above). It is also capable of acting, not only as the permeate collection tank, but also as a vacuum cleaning/chemical cleaning tank, thereby avoiding the need for the separate tanks and associated piping which have been required in known multiple membrane separation systems. Consequently, the equipment requirements of the system of the present invention, and hence the size and cost of the system, are considerably less than that of the known multiple membrane separation system described first above. The system of the present invention is also less prone to membrane separation unit damage, than the first described known multiple membrane separation system which, as already discussed, requires to be very carefully engineered to high degrees of accuracy due to its complex construction.

Additionally, as will be clearly evident from the following discussion of the accompanying drawings, if the system of the invention comprises a plurality of cross flow type membrane separation units connected in parallel configuration with the process fluid inlets of each unit being connected to common process fluid inlet and the process fluid outlet of each unit being connected to common process fluid outlet, the system is less prone to unsatisfactory seals being formed between each membrane separation unit and the associated common inlet and outlet for process fluid.

Several important aspects of the present invention enable multiple membrane separation systems of greatly differing size, and hence capacity, to be readily constructed. Firstly, any common process fluid inlet and/or common process fluid outlet may each be formed from two or more sections secured together, e.g. by means of appropriate male/female connectors or by means of bolts, with one or more membrane separation units being connected to each section. By forming the common process fluid inlet and/or outlet in such a sectional or modular manner, the number of membrane separation units present in the container of the system of the invention, and hence the capacity of the system can be readily varied, as desired. Of course, it is also possible to have such a modular form of construction if the membrane separation units are connected in series configuration, in which case the process fluid outlet of one such unit will be connected to the process fluid inlet of the next such unit in the series, e.g. by means of appropriate male/female connectors or by means of bolts. Secondly, as the container of the system of the present invention is not a pressurized container, it is possible to readily construct containers of greatly differing size and, hence, to construct multiple membrane separation systems of greatly varying membrane separation capacity. This is in contrast to the above-described known multiple membrane separation system, utilizing a pressure vessel, in which limitations are imposed on the maximum size of system that can be readily constructed due to engineering constraints in constructing such a pressure vessel. Thirdly, by only a relatively small increase in the size of the container, it is possible to achieve a substantial increase in the capacity of the system. That is, by increasing the size of the container such that one or more membrane separation units can be accommodated lengthwise and/or widthwise within the container, it is possible to accommodate a substantially greater number of membrane separation units in the container for only a small increase in the overall dimensions of the container. For example, if a container having a configuration of three cartridges x five cartridges (i.e. a total of 15 cartridges) is expanded such that it has a capacity of four cartridges x six cartridges (i.e. a total capacity of 24 cartridges), it can be seen that the overall capacity of the system is greatly increased (i.e. by 60%) without a substantial increase in the size of the container. Fourthly, if the outer solid wall, typically present in conventional membrane separation units, is omitted such that the whole of the available cross-sectional area of the membrane separation unit can be taken up with membranes, e.g. hollow fibers, potential problems associated with the epoxy material typically used in the end regions of the units to hold the membranes in place are avoided. One such potential problem is that, in the known membrane separation units comprising the solid outer wall, the solid ring of epoxy material surrounding the membrane area and located within the outer cartridge shell, is prone to the formation of pits or bubbles. In the past, any such pits or bubbles have been filled with epoxy material, but this can cause problems if this filler material detaches itself as it may be passed round the system and damage/destroy the membranes. This problem primarily occurs in the ring of solid epoxy material where no membranes, e.g. hollow fibers, are present. Fifthly, it is possible to interconnect a plurality of multiple membrane separation units of the invention, for example in series and/or parallel configuration, and to thereby readily vary the capacity of the overall membrane separation system.

When a plurality of systems are interconnected, it is also possible to run the overall system continuously by cleaning the individual systems in rotation whilst the other individual systems are in their normal operational mode. For example, if the overall system comprises three individual systems according to the invention, two such individual systems may be in their normal operational mode at any one time with the third individual system being in a cleaning mode.

The multiple membrane separation system may be used in a variety of procedures. For example, it can be used (i) to separate one or more components from a fluid with the desired product being the separated component(s), the fluid, or both, (ii) to produce a fluid having a concentration of one or more components thereof which is greater after treatment in the system than before treatment, or (iii) to purify a fluid with the desired product being the permeate. It is also possible for the system of the invention to be used in such a way that a chemical or biological reaction is allowed to take place therein, the membrane being impermeable to the product or one or more of the reactants, e.g. the membrane being impermeable to a catalyst used in the reaction. For example, lactose can be introduced into the system in the process feed with gatactosidase, which is an enzymic catalyst, being located in the fluid on the permeate side of the membranes (i.e. in the container). As the lactose-containing process fluid flows across the surface of the membrane, lactose will pass through the membrane and contact the galactosidase. The galactosidase will catalyse the conversion of the lactose into glucose and galactose, both of which can pass back through the membranes and into the process fluid. By controlling the rate at which the process fluid flows across the membrane surface and having a sufficiently high membrane surface area, it is possible for substantially all of the lactose to pass through the membranes and for the process fluid exiting the membrane units to contain galactose/glucose but be free, or substantially free, of lactose.

The system of the present invention can also be used in such a way as to enable the cleaning of such devices as swimming pools, fish ponds and condensate polishing storage tanks. In these instances the container of the system will be the swimming pool/ fish pond/storage tank itself and the membrane separation units may be located therein, e.g. at one end thereof. In use, fluid may be withdrawn from the swimming pool/fish pond/storage tank and subjected to the membrane separation procedure in the membrane separation units with the permeate being returned to the swimming pool/fish pond/storage tank. In the case of the cleaning of swimming pools by this technique, the requirement for sterilant/biocide, e.g. chlorine, may be reduced and any such reduction will be advantageous.

The present invention will now be further described by reference to the accompanying drawings in which like reference numerals refer to like parts and in which, for convenience, only one membrane separation unit is shown.

Figure 1:
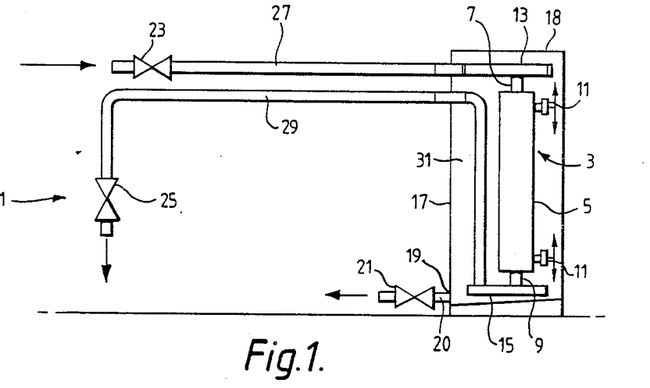
FIG. 1 is a schematic representation of a multiple membrane separation system in accordance with the present invention in which the membrane separation units are conventional ultrafiltration cartridges.

Referring to FIG. 1 there is shown, in schematic form, a multiple ultrafiltration system 1 according to the present invention and comprising a plurality of ultrafiltration units 3 (only one shown) in the form of conventional ultrafiltration cartridges, each ultrafiltration unit 3 comprising a plurality of hollow fiber ultrafiltration membranes (not shown) enclosed within an outer casing 5. Outer casing 5 is provided with a process fluid inlet 7 for introducing process fluid into the lumen of the hollow fiber membranes, a process fluid outlet 9 for removing treated process fluid from the hollow fiber membranes, and two permeate fluid outlets 11 allowing permeate fluid to exit from the units 3. The process fluid inlets 7 of each unit 3 are connected to a common process fluid inlet 13, and the process fluid outlets 9 of each unit 3 are connected to a common process fluid outlet 15. The permeate outlets 11 of each unit 3 open into the space formed between the units 3 and a container 17 in which the units 3 are housed. Container 17 has a lid 18 and an outlet 19. Outlet 19 is connected to piping 20 having an associated valve 21, common process fluid inlet 13 is connected to piping 27 having associated valve 23, and common process fluid outlet 15 is connected to piping 29 having associated valve 25. Outlet 19 enables permeate fluid to be removed from container 17 with the flow of permeate fluid through outlet 19 being controlled by valve 21.

The pressure within space 31 formed by the container 17, the units 3 and the lid 18 is maintained at, or substantially at, atmospheric pressure, for example by having the lid 18 in non-sealing engagement with container 17 or by providing a vent aperture in container 17 or lid 18, this vent connecting space 31 to the atmosphere.

In operation of the multiple ultrafiltration system 1 shown in FIG. 1, process fluid enters the units 3 via valve 23, piping 27, common process fluid inlet 13 and process fluid inlet 7, the flow of process fluid into the units 3 being effected by means of a pump (not shown) and being controlled by means of valve 23. The process fluid then passes through the lumen of the hollow fiber ultrafiltration membranes of the units 3 and a portion thereof exits the units 3 via process fluid outlet 9, common process fluid outlet 15, piping 29 and valve 25. Flow of the process fluid out of the units 3 is controlled by means of valve 25 and this fluid may, if desired, be recirculated back to pipe 27 for further passage through, and treatment in, the units 3. The remaining portion of the process fluid passes through the membrane and passes out of the units 3 via permeate outlet(s) 11 into the space 31 formed between the unit casings 5 and the container 17, where it collects as permeate fluid. The permeate fluid in space 31 is maintained at a level such that the units 3 are partially or completely immersed in the permeate fluid, for example by varying the degree of opening of valve 21.

Figure 2:
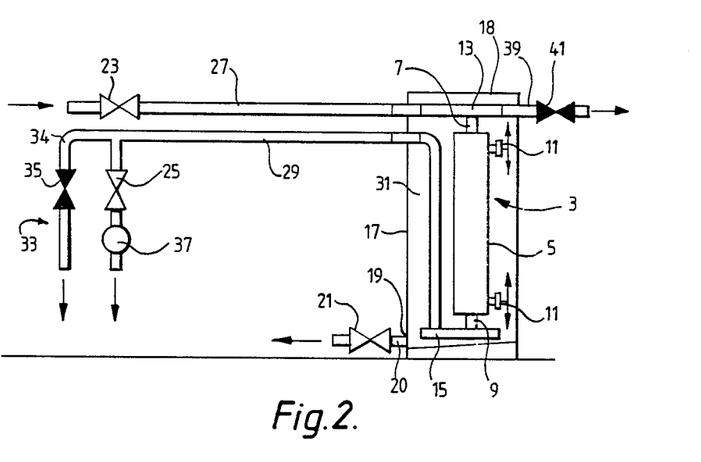
FIG. 2 is a schematic representation of the system shown in FIG. 1 but adapted to allow flushing of the ultrafiltration units for cleaning purposes, the system being shown in the process fluid treatment mode.

FIG. 2 illustrates a multiple ultrafiltration system 33 according to the present invention and similar to the multiple ultrafiltration system 1 depicted in FIG. 1 except that it includes: further piping 34 and associated valve 35, with piping 34 being connected to piping 29 upstream of valve 25; a flow meter 37 positioned downstream of valve 25; and an outlet 39 provided in common process fluid 13, outlet 39 having a valve 41 associated therewith.

Figure 3:
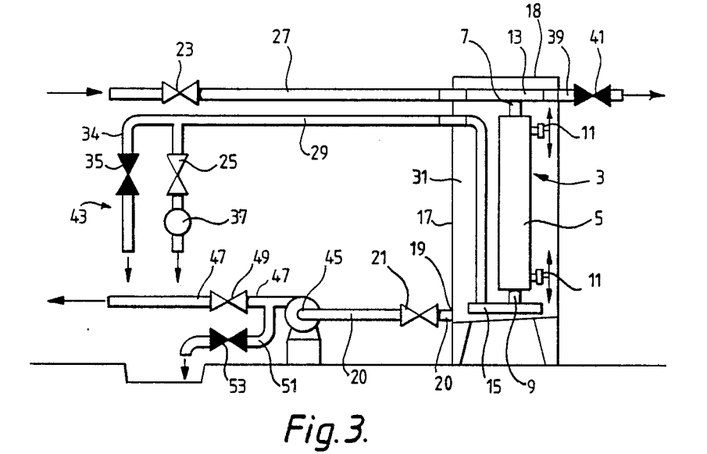
FIG. 3 is a schematic representation of the system shown in FIG. 2 but including a pump on the permeate outlet of the container, the system being shown in the process fluid treatment mode.

When system 33 is used to treat process fluid, valves 35 and 41 are closed (as shown in FIG. 3) and system 33 is operated in the same manner as system 1 of FIG. 1.

System 33 is capable of allowing periodic cleaning of the ultrafiltration units 3 by means of the above-described fast flush technique to remove any foulant material accumulating on the process fluid side of the hollow fiber ultrafiltration membranes and thereby prevent eventual clogging of the membranes. This cleaning operation is carried out by opening valve 35 which enables the passage of flushing fluid, e.g. water, at a high flow rate through the ultrafiltration units 3, the high flow rate causing foulant material accumulating on the process fluid side of the hollow fiber ultrafiltration membranes to be dislodged and flushed out of the system. The flushing fluid is introduced into the units 3 via valve 23, piping 27, common process fluid inlet 13 and process fluid inlet 7. After dislodging accumulated foulant material from the process fluid side of the hollow fiber ultrafiltration membranes, the flushing fluid/accumulated material passes out of the units 3 via process fluid outlet 9, common process fluid outlet 15, piping 29 and valves 35 and 25. The degree of opening of valves 35 and 25 is such that all, or substantially all, of the flushing fluid/accumulated foulant material passes out of the system via valve 35, this enabling the flushing fluid, if desired, to be discharged to waste. Inclusion of valve 35 and its associated piping enables flushing fluid/accumulated material to be kept separate from any treated process fluid recovery system located downstream of valve 25 and flow meter 37. Any flushing fluid passing through the membranes and collecting in space 31 will be free of foulant material and may, therefore, be reused.

FIG. 3 illustrates a multiple ultrafiltration system 43 according to the present invention and similar to the multiple ultrafiltration system 33 depicted in FIG. 2 except that it includes a pump 45 located downstream of valve 21, fluid exiting pump 45 being passed either through piping 47 and associated valve 49, or through piping 51 and associated valve 53.

In FIG. 3 the multiple ultrafiltration system 43 is shown in its fluid treatment mode, valves 35, 41 and 53 being closed. In this mode, multiple ultrafiltration system 43 operates in the same manner as multiple ultrafiltration system 33 of FIG. 2 except that the flow of permeate fluid out of container 17 is aided by means of pump 45. The permeate fluid, after passing through pump 45, exits the system via piping 47 and associated valve 49.

The system 43 of FIG. 3 is also capable of being cleaned by the fast flush technique, and in this mode the system is operated in the same manner as described for system 33 of FIG. 2, except that the flow of permeate fluid out of container 17 is aided by means of pump 45.

The presence of piping 51 and valve 53 allows drainage of the container 17. To achieve such drainage, valve 49 is closed and valve 53 is opened.

Figure 4:
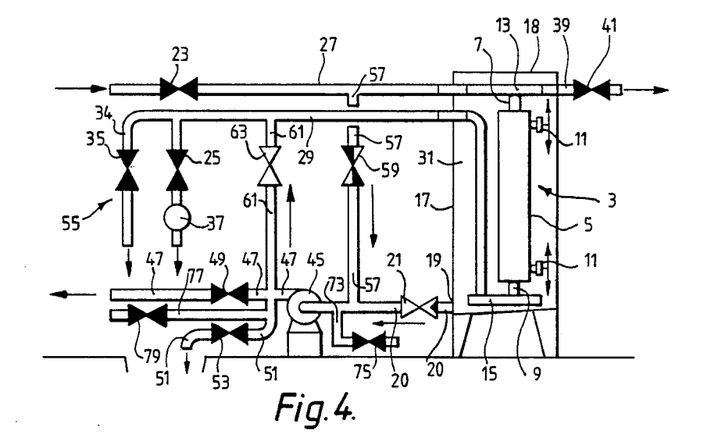
FIG. 4 is a schematic representation of the system shown in FIG. 3 but with added piping/valving enabling a circulation loop to be formed for chemical cleaning of the membrane surfaces of the ultrafiltration units, the system being shown in the chemical cleaning mode.

FIG. 4 illustrates a multiple ultrafiltration system 55 according to the present invention and similar to the multiple ultrafiltration system 43 depicted in FIG. 3 except that it includes additional piping/valving enabling chemical cleaning of the system to be carried out and the formation of a chemical cleaning circulation loop.

The additional piping/valving takes the form of: piping 57 having an associated valve 59, one end of piping 57 being connected to piping 27 and the other end of piping 57 being connected to piping 20 between valve 21 and pump 45; piping 61 having an associated valve 63, one end of piping 61 being connected to piping 29 and the other end being connected to piping 47; piping 73 having associated valve 75, one end of piping 73 being connected to piping 20; and piping 77 having an associated valve 79, one end of piping 77 being connected to piping 51.

In FIG. 4, the multiple ultrafiltration system 55 is shown in the chemical cleaning mode, the cleaning fluid initially being introduced into the system via piping 73 and valve 75 and being removed from the system, after the cleaning cycle is completed, via piping 77 and valve 79. During the cleaning cycle valves 23, 25, 35, 41, 49 and 53 are closed and valves valves 21, 59 and 63 are at least partially open. The chemical cleaning fluid passes upwardly through ultrafiltration cartridges 3 with a portion of the cleaning fluid passing through outlet 7 located at the top of each of ultrafiltration units 3 and the remainder of the cleaning fluid passing through the hollow fiber ultrafiltration membranes and exiting units 3 through outlets 11 and hence into space 31. The cleaning fluid exiting the units 3 via outlet 7 then passes through common process fluid inlet 13, piping 27, piping 57 with associated valve 59, pump 45, piping 47, piping 61 with associated valve 63, piping 9, and is then reintroduced into the bottom of ultrafiltration units 3. There is thus formed a circulation loop for the cleaning fluid and to compensate for fluid lost from this loop by passage of fluid through the membranes and into space 31, fluid is drawn from space 31, through piping 19, valve 21, piping 20 and into the circulation loop. The flow of cleaning fluid around this circulation loop can be controlled by varying the degree of opening of valves 21, 59 and 63. In such a chemical cleaning operation, approximately 70% of the cleaning fluid introduced into the bottom of units 3 may pass out of the top of the units 3 and approximately 30% of the cleaning fluid may pass through the hollow fiber ultrafiltration membranes and exit the units 3 through outlets 11.

An advantage of being able to conduct chemical cleaning in this manner is that the foulant material is retained in only a small proportion of the overall volume of cleaning fluid, i.e. the foulant material is retained in only the cleaning fluid passing around the circulation loop. The majority of the cleaning fluid is present in the space 31 in container 17 and does not become contaminated with the foulant material. This cleaning fluid in space 31 can, therefore, be recovered and reused, without having to itself be cleaned to remove foulant material, for cleaning of further membrane separation units. In contrast, chemical cleaning of known membrane separation systems typically involves passing the cleaning fluid from a storage tank and through the membrane units to remove foulant material therefrom. The whole of this cleaning fluid, which will now be contaminated with the foulant material, is then returned to the storage tank. Only a small proportion of the cleaning fluid will pass through the membranes to the permeate side thereof and hence remain free of foulant material contamination. Consequently, in the chemical cleaning of known membrane separation systems, the bulk of the cleaning fluid, i.e. the fluid in the storage tank, becomes contaminated with foulant material and must itself be cleaned to remove the foulant material therefrom before it can be reused for cleaning of further membrane separation systems.

To operate multiple ultrafiltration system 55 in the fluid treatment mode, valves 21, 23, 25 and 49 will be in their open position and vales 35, 41, 53, 59, 63, 75 and 79 will be in their closed position. The system is then operated in the same manner as multiple ultrafiltration system 43 depicted in FIG. 3.

Figure 5:
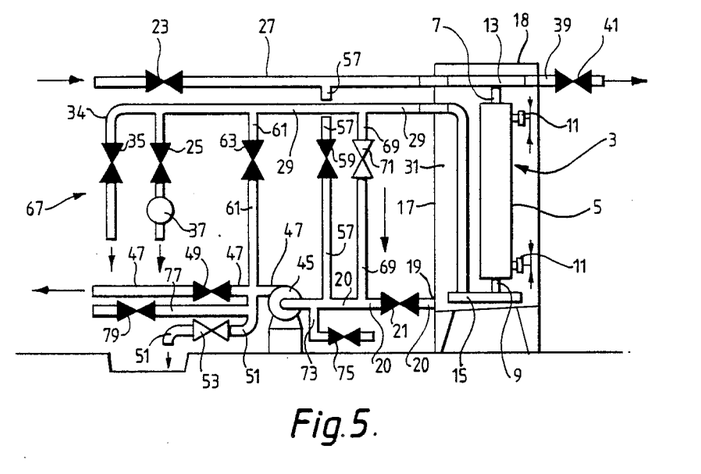
FIG. 5 is a schematic representation of the system shown in FIG. 4 but with added piping/valving enabling suction backwash cleaning of the ultrafiltration membrane surfaces utilizing the pump located on the permeate outlet to create the necessary reduced pressure, the system being shown in the suction backwash cleaning mode.

FIG. 5 illustrates a multiple ultrafiltration system 67 according to the present invention and similar to the multiple ultrafiltration system 55 depicted in FIG. 4 except that it includes piping 69 and associated valve 71, one end of piping 69 being connected to piping 29 and the other end of piping 69 being connected to piping 20. In FIG. 5 multiple ultrafiltration system 67 is shown in a cleaning mode for cleaning ultrafiltration units 3 by means of suction backwash, i.e. flow of fluid through the units 3 in a direction opposite to that when the system is used in its fluid treatment mode.

In the suction backwash cleaning mode depicted in FIG. 5, valves 71 and 53 are open but all of the remaining valves are closed. To effect suction backwash cleaning, the ultrafiltration units 3 will initially be substantially, or completely, immersed in fluid so that, when pump 45 operates, fluid is drawn out of the space 31, between ultrafiltration unit walls 5 and container 17, and into the ultrafiltration units 3 through outlets 11. The fluid then passes through the hollow fiber ultrafiltration membranes and in doing so will dislodge and accumulated foulant material on the process fluid side of the membranes. The fluid/accumulated foulant material will then pass out of the units 3 via outlet 9 and pass through piping 29, piping 69 with associated valve 71, piping 20, pump 45, piping 47 and piping 51 with associated valve 53. The fluid/accumulated foulant material exiting pipe 53 may then be discarded waste.

Although the embodiment depicted in FIG. 5 illustrates suction backwash cleaning of system 67 by having only valves 71 and 53 open such that the reduced pressure is applied to the process fluid outlet 9 of each ultrafiltration unit 3, it is also possible to operate the system 67 in the suction backwash cleaning mode either with only valves 59 and 53 open such that the reduced pressure is applied to the process fluid inlet 7 of each unit 3, or with valves 59, 71 and 53 open (all other valves being closed) such that the reduced pressure is applied to both the process fluid inlet 7 and the process fluid outlet 9 of each unit 3.

In a preferred embodiment, suction backwash cleaning of system 67 is carried out by (i) initially having only valves 59, 71 and 53 open, then (ii) having only valves 71 and 53 open, and (iii) in the reverse order.

The advantages of such suction backwash cleaning of the system are the effective cleaning of the hollow fiber ultrafiltration membranes, even severely fouled membranes, can be achieved without the need for additional external equipment. Also, the fluid pressure within the system, and the pressure difference between opposite sides of the membrane, can be lower than the flushing form of cleaning described above in connection with FIG. 2 and, as a result, the suction backwash cleaning of the ultrafiltration units 3 enables the risk of damage to the ultrafiltration membranes to be reduced.

When multiple ultrafiltration system 67 is operated in its process fluid treatment mode, valves 21, 23, 25 and 49 will be open and valves 35, 41, 53, 59, 63, 71, 75 and 79 will be closed. With the valves in these open/closed positions, the system 67 is operated in the same manner as described above for the process fluid treatment mode of operation of the systems depicted in FIGS. 1–4.

Further, multiple ultrafiltration system 67 can be chemically cleaned by having valves 23, 25, 35, 41, 49, 53 and 71 closed and valves 21, 59 and 63 at least partially open. With the valves in these positions, chemical cleaning of the system is effected in the same manner as with multiple ultrafiltration system 55 depicted in FIG. 4. Also, as in FIG. 4, cleaning fluid is initially introduced into the system via piping 73 and valve 75 and is removed from the system, after the cleaning cycle is completed, via piping 77 and valve 79.

The multifunctional character of pump 45, i.e. as a pump to aid in removal of permeate fluid from container 17, to circulate chemical cleaning fluid, to aid drainage of the system, and to provide suction in the suction backwash cleaning mode, is economically advantageous.

An ultrafiltration unit integrity check can be carried out on any of the systems depicted in FIGS. 1 to 5 by maintaining the ultrafiltration units 3 immersed in fluid and closing all of the valves except valve 41, which is maintained open, and valve 25, which is maintained partially open. A gas, e.g. nitrogen, is then introduced into the system via valve 41 and will show up, by way of gas leakage into the fluid in which the ultrafiltration units are immersed, any defects in the integrity of the units.

Figure 6:
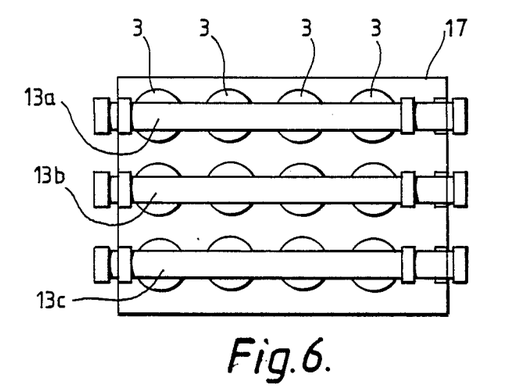
FIGS. 6 and 7 are schematic representations of multiple membrane separation systems according to the present invention viewed from above and showing alternative arrangements for the common process fluid inlet.
Figure 7:
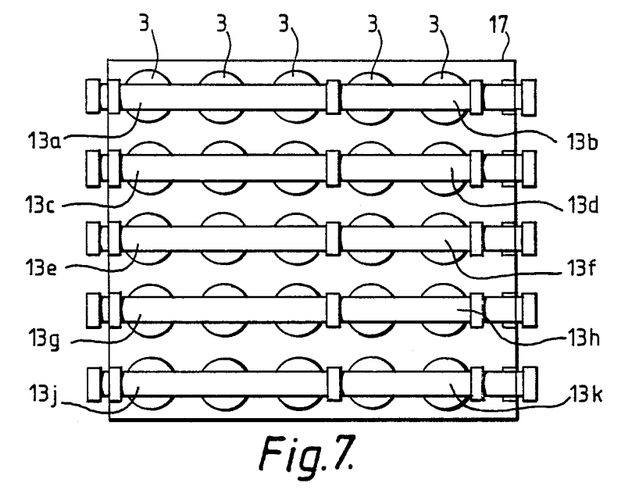

FIGS. 6 and 7 are schematic representations showing possible arrangements for common process fluid inlet 13. Similar arrangements could, of course, be used for common process fluid outlet 15.

In FIG. 6 the common process fluid inlet is formed in 3 sections (shown as 13a, 13b, 13c), each section having four multiple ultrafiltration units 3 connected thereto. Each of sections 13a, 13b, and 13c will be connected together (not shown) to form a single common process fluid inlet.

In the embodiment depicted in FIG. 7, five sections of the common process fluid inlet each have three multiple ultrafiltration units 3 connected thereto, and five sections each have two multiple ultrafiltration units 3 connected thereto.

From FIGS. 6 and 7 it is readily evident that the size, and hence capacity of a multiple ultrafiltration system in accordance with the present invention, can be easily varied, as desired, by simply adding or removing sections of the common process inlet and outlet and the ultrafiltration units attached to such sections.

Although the systems shown in the accompanying drawings are in the form of multiple ultrafiltration systems comprising a plurality of conventional ultrafiltration cartridges, such conventional ultrafiltration cartridges could, of course, be replaced by other types of membrane separation units such as microfiltration or reverse osmosis units or other types of ultrafiltration units.

As the multiple membrane separation systems according to the present invention do not require the up-piping, used in the first described known multiple membrane filtration system, for removing permeate fluid from such known system, the system according to the present invention is simpler in construction than such known system.

Further, in contrast to the known multiple filtration systems wherein membrane separation cartridges are mounted on an external framework which necessitates very careful engineering to avoid damage to the cartridges, the multiple membrane separation units of the system according to the present invention do not need to be mounted on such a frame, and damage to the separation units is, therefore, less likely to occur.

What is claimed is:

1. A multiple membrane separation system, which comprises:
   (a) a plurality of discrete membrane separation units, each membrane separation unit comprising at least two membranes, an inlet for process fluid and, optionally, an outlet for process fluid;
   (b) means for locating said membrane separation units within a container for permeate, said container comprising a permeate outlet, and wherein the container enables the membrane separation units to be at least partially immersed in permeate; and
   (c) a conduit means to enable reduced pressure to be created at the common process fluid inlet and/or the common process fluid outlet of the membrane separation units and thereby resulting in fluid being drawn through the membranes from the permeate side thereof to the process fluid side thereof.

2. A system as claimed in claim 1, in which the container is sub-divided into two or more interconnected compartments with each compartment having located therein at least one of the membrane separation units.

3. A system as claimed in claim 1 in which the membranes are hollow fiber membranes.

4. A system as claimed in claim 3 in which each membrane separation unit consists of a plurality of hollow fiber membranes housed within a foraminous outer wall, inlet for process fluid, and, optionally, outlet for process fluid.

5. A system as claimed in claim 1, in which the membranes are polymeric, for example polysulfone or polyvinyl chloride, membranes.

6. A system as claimed in claim 1, in which the membranes are ceramic membranes.

7. A system as claimed in claim 1, in which the membrane separation units are ultrafiltration membrane units.

8. A system as claimed in claim 1, which further comprises:
   (d) a common process fluid inlet to which the process fluid inlets are connected;
   (e) a common process fluid outlet to which the process fluid outlets are connected;
   (f) a first pipe connected to the common process fluid inlet, said first pipe having a first valve located therein;
   (g) a second pipe connected to the common process fluid outlet, said second pipe having a second valve located therein; and
   (h) a third pipe connected to the permeate outlet from the container, said third pipe having a third valve located therein.

9. A system as claimed in claim 8, which further comprises:
   (i) a fourth pipe connected to said second pipe upstream of said second valve and having a fourth valve located therein.

10. A system as claimed in claim 9, which further comprises;
    (j) a pump, the inlet of which is connected to said third pipe downstream of said third valve and the outlet of which is connected to a fifth pipe having a fifth valve located therein, and wherein, connected to said fifth pipe, intermediate said pump and said fifth valve, is a sixth pipe having a sixth valve located therein.

11. A system as claimed in claim 10, which further comprises:
    (k) a seventh pipe having a seventh valve located therein, one end of said seventh pipe being connected to said first pipe intermediate said first valve and the common process fluid inlet and the other end of said seventh pipe being connected to said third pipe intermediate said valve and said pump, and an eighth pipe having an eighth valve located therein, one end of said eighth pipe being connected to said second pipe intermediate said common process fluid outlet and the connection between the second pipe and said fourth pipe.

12. A system as claimed in claim 11, which further comprises:

(m) a ninth pipe having a ninth valve located therein, one end of said ninth pipe being connected to said second pipe intermediate said common process fluid outlet and the connection between said second pipe and said eighth pipe and the other end of said ninth pipe being connected to said third pipe intermediate said third valve and the connection between said third pipe and said seventh pipe.

13. A system as claimed in claim 1, which comprises a plurality of membrane separation units, each such unit comprising a process fluid inlet and a process fluid outlet, the process fluid inlet of each unit being connected to a common process fluid inlet and the process fluid outlet of each unit being connected to common process fluid outlet.

14. A method for membrane separation of a fluid, which comprises utilizing a multiple membrane separation system as claimed in claim 1.

15. A method as claimed in claim 14, in which a chemical or biological reaction occurs in the fluid within the system.

* * * * *